April 23, 1963
T. J. MALLEY ETAL
3,086,845
ALUMINA OF CONTROLLED DENSITY
Original Filed May 17, 1957
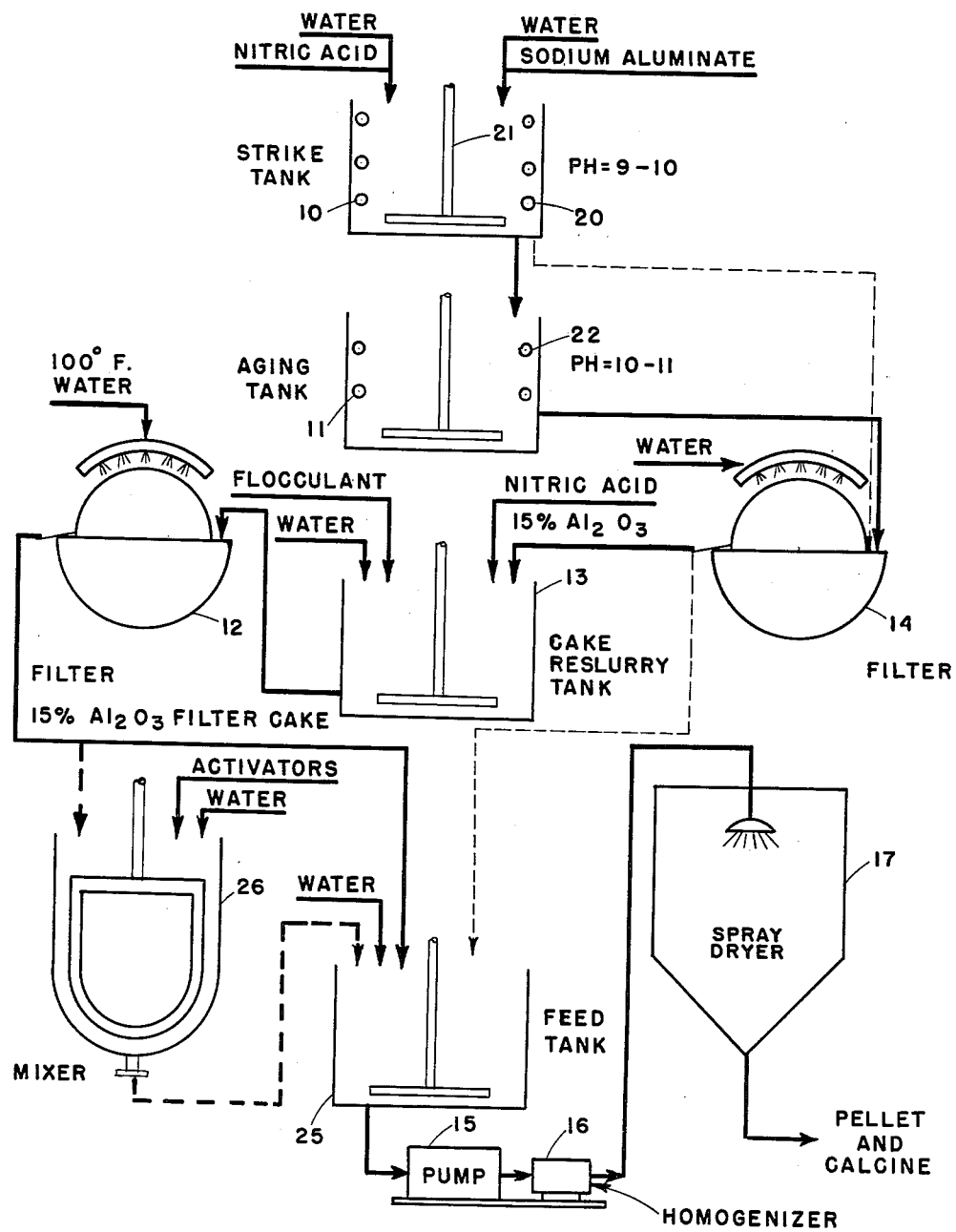
INVENTORS
THOMAS J. MALLEY
HARVEY D. SCHINDLER
JOHN D. PENNELL, JR.
BY Wm. P. Spielman
ATTORNEY

United States Patent Office 3,086,845
Patented Apr. 23, 1963

3,086,845
ALUMINA OF CONTROLLED DENSITY
Thomas J. Malley, Stamford, Harvey D. Schindler, Darien, and John D. Pennell, Jr., Stamford, Conn., assignors to American Cyanamid Company, New York, N.Y., a corporation of Maine
Original application May 17, 1957, Ser. No. 669,000, now Patent No. 2,980,632, dated Apr. 18, 1961. Divided and this application Jan 30, 1958, Ser. No. 712,205
2 Claims. (Cl. 23—143)

This invention relates to methods of preparing alumina gels and calcined alumina having a predetermined and controlled density, pore volume and surface area and to catalyst prepared from and containing such alumina. The invention also includes certain alumina-containing catalyst compositions in which the density, pore volume, attrition resistance and other characteristics are controlled to produce optimum performance in particular catalytic processes such as in the dehydrogenation of hydrocarbons, catalytic reforming of petroleum fractions and the like, and also processes employing these catalysts.

A wide variety of catalysts are now in commercial use in which an activating metal or metal oxide is supported on or impregnated throughout an alumina base. One of the principal objects of our present invention is to provide a manufacturing process for the production of the alumina gels used in making such catalysts that will permit a close and accurate control of the density and porosity of the alumina, and therefore of the finished catalyst. A further object is the provision of such a method that is particularly well adapted for large scale manufacture, including the removal of alkali metal compounds and other impurities from the alumina. Additional objects will become apparent from the following description of the invention, including the specific examples, when taken with the appended claims.

The activity of catalysts used in heterogeneous liquid and vapor phase reactions is ordinarily measured on a volume basis. Thus, the term space velocity is used to express the volumes of reagent passing through a given volume of catalyst per hour. The cost of the catalyst, on the other hand, is usually based on its weight. The cost of the quantity of catalyst necessary for a given process can therefore frequently be reduced by reducing the catalyst density. We have discovered a method by which the density of alumina gel-based catalysts can be controlled throughout a wide range, thus permitting the preparation of the most economical and efficient catalysts of this class for any desired purpose.

Alumina of suitable activity for catalytic purposes is frequently prepared by precipitation from a water solution of a water soluble aluminum compound which may be either an aluminum salt such as aluminum sulfate, aluminum nitrate, aluminum chloride and the like or an alkali metal aluminate such as sodium or potassium aluminate. If hydrated alumina prepared by ordinary precipitation procedures is spray dried, a light, fluffy product of low apparent density, usually wihtin the range of about 0.2–0.3 gram per cc., is obtained. We have found that treatment of the precipitated hydrated alumina under controlled conditions of alkalinity, either during its formation or in a subsequent step, or both, will convert it into a form in which it can be densified by homogenization so that dried alumina gels having a higher density can be obtained.

The process of our invention in its broadest aspects therefore comprises the densification by comminution of a hydrated alumina which has been made responsive to homogenization either by precipitation from an aqueous solution of a water-soluble aluminum compound under the alkaline conditions hereinafter described, or which has been aged under alkaline conditions at a pH higher than that of its precipitation, or both. This process can be used either to prepare dried alumina gels or calcined alumina of controlled density and surface area for subsequent impregnation with activators such as finely divided platinum or palladium, molybdenum oxide, tungstic oxide or chromium oxides, with or without oxides of cobalt or nickel, or the activating metals or metal compounds may be impregnated into the hydrated alumina before drying and either before or after the homogenizing step. The impregnated alumina gels obtained by drying the hydrated alumina in a current of hot gases, and usually having a total moisture content within the range of about 15–40% as determined by loss on ignition, may be used as catalysts or they may be pelleted and dried by calcination at higher temperatures to obtain more active catalysts having a much lower moisture content.

Hydrated alumina capable of being densified by homogenization can be obtained by precipitation from a water-soluble aluminum compound within a pH range between about 9.0 and 10.5. When these conditions are maintained the alumina is precipitated in a crystalline form in which it can be filtered at reasonably good filtration rates and washed free from contaminants and the alumina particles can be broken down to an increasing extent by increasing the severity of comminution. The degree of response of the hydrated alumina to homogenization increases with increasing pH values within the above range, but at pH values above 10.5 the formation of slimes is noted and control of density by homogenization is erratic. One of the primary control points in obtaining alumina of controlled density is therefore the adjustment of the hydrated alumina precipitation, or strike, within the indicated range.

The second principal control feature to be used in regulating the density of the dried alumina is the extent or severity of homogenization. Since the most practical and preferred method of comminuting the hydrated alumina is by passing it through a homogenizer, this factor can be conveniently and accurately described with reference to an ordinary spring-pressed homogenizing valve. In the present specification and claims the extent of comminution will therefore be defined as that corresponding to the homogenization obtained by passing the hydrated alumina slurries through such a valve at a defined pressure drop.

Hydrated alumina capable of being densified by homogenization is also obtainable by aging the hydrated alumina slurries under alkaline conditions. We have found that an effective response to homogenization is obtainable by aging these slurries under more strongly alkaline conditions than those used in the alumina precipitation and within the pH range of about 10.0–11.0. While hydrated alumina precipitated from water-soluble aluminum compounds at pH values of from 7.0 to 9.0 can be made responsive to homogenization by aging at pH values within this range, a considerably better response is obtained with slurries of hydrated alumina precipitated in the pH range of 9–10.5. The preferred method of our invention, in obtaining alumina and impregnated alumina catalysts of controlled density, therefore includes the densification by homogenization of hydrated alumina precipitated from water-soluble aluminum compounds at a pH of from 9 to 10.5 and aged at a pH within the range of 10–11. In all cases the aging should be continued for at least 0.25–0.5 hour, and may be continued for 1 hour or longer.

The response of the alumina to homogenization can also be increased slightly by controlling the percent of solids in the strike. However if the strike solids are below about 4% the filtering and washing characteristics of the alumina are impaired because of the formation of slimes and it may become difficult or impossible to remove sodium compounds and other impurities to the extent necessary for catalytic purposes. For most purposes the strike solids are therefore maintained between about 5% and 7% with a top limit of about 9%; at higher strike solids the viscosity is such that it is difficult or impossible to maintain uniform pH conditions throughout the strike tank. Efficient and powerful agitation, as by the use of turbine agitators, is particularly desirable at high strike solids to assist in maintaining a pH at a uniform level.

The invention will be further described with reference to the accompanying drawing wherein the figure is a flow sheet on which the apparatus used in producing alumina of controlled density is illustrated diagrammatically.

The equipment consists generally of a strike tank 10, in which hydrated alumina is precipitated, an aging tank 11, filters 12 and 14 for purifying the hydrated alumina connected by a cake reslurry tank 13, a pump and homogenizer 15 and 16, and a spray drier 17. In the strike tank 10 aqueous solutions of a water-soluble aluminum compound and a neutralizing agent are introduced simultaneously in separate streams at rates such that a substantially constant pH is maintained throughout the alumina precipitation. Suitable strike temperatures preferably within the range of 70°–130° F. are maintained by means of cooling coils 20. An agitator 21, which is sufficiently powerful to mix the contents of the strike tank thoroughly and is preferably a turbine agitator, is operated during the alumina precipitation, and an initial charge or heel of water should be placed in the tank before the addition of reagents is started. The desired constant pH is maintained by controlling the concentration and rate of addition of the alkaline and acidic reagents. At the end of the strike the alumina slurry may be passed directly to the first filter 14 or it may be held in the aging tank 11, with gentle agitation, for a sufficiently long time to improve its filtering characteristics. If it is desired to increase the response of the alumina slurry to homogenization its pH is maintained between 10 and 11 in the aging tank 11 and the aging time is at least 0.25–0.5 hour. The aging temperature may vary between about 90°–130° F. and is controlled by means of temperature regulating coils 22. The aging is conducted with gentle agitation, preferably by means of a gate or paddle type agitator.

Operation of the first filter 14 may vary to some extent with the reagents used in the strike. When sodium aluminate and a mineral acid such as nitric acid are used in the strike tank, as illustrated in the drawing, the filtration temperature is preferably about 100° F., and if the alkali metal content of the filter cake is reduced to a suitable extent, as below 0.02% in the case of hydroforming and hydrodesulfurization catalysts, the cake can be sent directly to a feed tank 25 for homogenization and drying, or it may be introduced into a mixer 26 for admixture with activators such as ammonium molybdate, chromic acid, platinic chloride and the like. When the strike is made with aluminum sulfate and sodium aluminate solutions, however, two or more filtrations and washings are usually needed to remove impurities from the hydrated alumina to the desired extent, and therefore the washed cake from the filter 14 is passed into the cake reslurry tank 13 and suspended in water. Sufficient nitric acid to bring the pH of the suspension to about 6–8 may be added in this tank and a flocculant such as glue, polyacrylamide, and the like may also be added to improve filtration characteristics if desired. Such flocculants may be added before the first filtration if desired. The resulting slurry is then filtered on the second filter 12 and washed with pure water, preferably having a temperature in the neighborhood of 100° F. The resulting filter cake is then introduced into the tank 25, either directly or after admixture with one or more activators in the tank 26.

Alumina slurry from the tank 25, which may have an $Al_2O_3$ content of 6–20% and may contain the quantities of activators desired in the finished catalyst is passed through suitable homogenizing and grinding mechanism. The type indicated on the drawing by reference numerals 15 and 16 consists of a high pressure pump followed by a homogenizing valve. The pump, which is preferably of the piston type, should be capable of generating pressures up to about 3000 lbs. per square inch, and the pressure drop across the homogenizing valve should be adjustable so that the extent of homogenizing can be controlled. It is in this homogenizer that the hydrated alumina, pre-conditioned for response to homogenization by the pH conditions in the tanks 10 or 11 and if desired by the strike solids and aging times, is brought to the controlled density desired in the finished catalyst.

The homogenized alumina slurry may be dried by any suitable means, as in a tray drier or a rotating kiln in contact with hot gases. In accordance with another important feature of our invention, however, it is preferably introduced into the spray drier 17 and set to a gel while suspended in a current of hot gases. By spray drying the homogenized slurry we obtain an alumina gel in the form of microspheres having a highly uniform particle size in addition to their controlled density. We therefore obtain an alumina product having a solids content of about 60–80% and a moisture content of about 20–40% that can be used for a wide variety of purposes. It can be admixed with promoting metal compounds such as those described above, or if promoters or activators have been incorporated with the hydrated alumina in the mixer 26 it can be pelleted and calcined to form a finished catalyst. Any suitable spray drier may be used; one that has been employed with good results is described in U.S. Patent No. 2,644,516, dated July 7, 1953. Although gas inlet temperatures up to 1300° F. have been used successfully the temperature of the drying gases entering the spray drying chamber is preferably controlled within the range of about 500°–1000° F. so that the hydrated alumina will be converted into a set, partially dehydrated gel during the drying procedure. This gel, after pelleting, may be fully dehydrated by calcining it in a rotary kiln at temperatures of about 1100°–1350° F. for times up to about 4–5 hours.

The above-described principles of our invention may be applied to advantage for the production of a wide variety of catalysts as well as for the manufacture of alumina gels and calcined alumina for other purposes. The partially dried alumina gel may be coated or impregnated with from about 8% to 20% or more of molybdenum oxide by soaking or grinding with an ammonium molybdate solution, followed by pelleting and calcination; excellent hydroforming catalysts of controlled density and surface area are obtained by this procedure. If a platinum-containing reforming catalyst is desired, the hydrated alumina gel may be impregnated with platinic chloride solution by the same procedure, with or without subsequent treatment with hydrogen sulfide or ammonium sulfide solution to precipitate the platinum. If desired, these catalysts may be further activated by the incorporation of hydrofluoric acid, hydrochloric acid or aluminum chloride in small amounts. Such catalysts preferably contain about 0.1–0.8% by weight of platinum and up to 3% of combined halogen, the balance being substantially all alumina.

The manner in which the principles of our invention may be applied for the production of catalysts, and the advantageous characteristics of such catalysts, are described in the following examples.

EXAMPLE 1

Spray dried alumina was prepared by the above-described process using as reagents a sodium aluminate solution containing 29% $Al_2O_3$ and 31% aqueous nitric acid. A heel of water was placed in the strike tank 10, the agitator was started and stoichiometrically equivalent quantities of the aluminate and acid solutions were run in simultaneously along with sufficient water to maintain the solids at 7% and at rates such as to maintain pH values in the tank between 9.0 and 10.0, while the strike temperature was maintained between 80° and 120° F. by means of the cooling coils. The slurry was then dropped into the aging tank 11, the pH was adjusted to 7.0 and the batch was aged for 30 minutes at about 100°–120° F. It was then filtered and the filter cake was washed at the same pH using three displacements of 100° F., deionized water.

Portions of the washed filter caker were pumped directly into a spray drier while other portions were homogenized by passage between a spring-pressed homogenizing valve and its seat, the extent of homogenization being controlled by adjustment of the spring. In the spray drier the slurry was injected through stationary nozzles into a descending rotating column of gas having an inlet temperature of about 600°–700° F. and outlet temperature of about 250° F. and dried to a heat-set gel having a moisture content of about 20–25%, as measured by loss on ignition.

When the pH of the strike was 9.1 the apparent bulk density of the spray dried unhomogenized alumina was 0.2 gram per cc. This was increased to 0.3 by homogenizing at 2000 lbs. pressure drop across the homogenizing valve. With a strike pH of 9.3 the A.B.D. of the spray dried material was 0.24 without homogenization and 0.60 after homogenizing at 2000 lbs.

EXAMPLE 2

Spray dried alumina was also prepared by the process described in Example 1 using a corresponding quantity of aluminum sulfate solution as the acidifying agent instead of nitric acid. These reagents were added simultaneously to a heel of water in the strike tank 10 together with sufficient water to maintain the strike solids at 7% while holding the temperature between 80° and 110° F. The rates of addition were such that the strike pH was constant at 9.5.

Two filtrations were used in order to remove both the combined sulfate and the sodium ions. The first filter 14 was washed with three displacements of ammoniacal water having a pH of about 8–9 to decompose basic aluminum sulfate. The filter cake was reslurried in water in the reslurry tank 13 to a 7% solids content and its pH was adjusted to about 7.0 using nitric acid to avoid the introduction of more sulfate. The alumina slurry was then passed over the second filter 12 and washed with three displacements of pure water. The filter cake was pumped into the feed tank 25 and part of the slurry was homogenized and spray dried as in Example 1 and its A.B.D. (in grams per cc.) was determined. The remainder was spray dried under the same conditions without comminution.

The A.B.D. of the alumina homogenized at 550 lbs. pressure drop was 0.65; with 1000 lbs. homogenizing pressure it was 0.86. The portion dried without homogenizing had an A.B.D. of 0.35.

EXAMPLE 3

Several batches of hydrated alumina were precipitated from stoichiometrically equivalent quantities of sodium aluminate and aluminum sulfate solutions by the procedure of Example 2 while maintaining the strike solids at 7%, the temperature at about 110°–120° F. and a constant pH between 7.0 and 10.5. At the end of the strike the flow of aluminum sulfate solution was reduced, so that the slurry pH was higher, and the batches were run into the tank 11 and aged at about 100° F. for 0.5–1 hour. They were then filtered and washed as in Example 2 and pumped through the homogenizing valve 16 into the spray drier 17 and dried under the conditions described in Example 1.

The pH at which the slurries were aged and its effect on the purity and A.B.D. of the spray dried alumina at varying pressure drops across the homogenizing valve is shown in the following table:

Table 1

| Aging, pH | Residual, Percent | | A.B.D. at Pressure (p.s.i.) | | |
|---|---|---|---|---|---|
| | Na$_2$O | SO$_4$ | None | 1,000 | 2,000 |
| 10.2 | 0.00 | 0.00 | 0.24 | | 0.32 |
| 10.7 | 0.03 | 0.07 | 0.53 | 0.86 | |
| 11.0 | 0.04 | 0.15 | 0.56 | 0.94 | 0.95 |

These results, which were obtained with a strike pH of 9.3, indicate that hydrated alumina prepared by precipitation from aqueous solutions of water-soluble aluminum compounds can also be converted by aging into a condition in which it is densified by homogenization. Our experiments have shown, however, that this density response to homogenization is obtained only when the aging pH is higher than that of the strike. If the alumina has been overly slimed by too high a pH in the strike tank, either locally because of inadequate mixing or because the pH throughout this tank is above about 10.5, the condition cannot be corrected by aging at a lower pH value.

Portions of the alumina slurry of Example 2 were also aged for 30 minutes at varying pH values, filtered and washed, and spray dried with and without homogenization; Table 2 shows the conditions used and the results obtained.

Table 2

| Aging, pH | Residual, Percent | | A.B.D. at Pressure (p.s.i.) | | |
|---|---|---|---|---|---|
| | Na$_2$O | SO$_4$ | None | 1,000 | 2,000 |
| 10.0 | 0.03 | 0.06 | 0.39 | 0.56 | 0.74 |
| 10.2 | 0.016 | 0.15 | 0.48 | 0.78 | 0.95 |
| 11.0 | 0.04 | 0.00 | 0.62 | 0.88 | 0.96 |

When the strike was carried out at a pH of 7.0 and 7% solids and the batch was aged at 100° F. and a pH of 10.6 for 0.5–1 hour the A.B.D. of a sample of the alumina spray dried without homogenization was 0.32. This was increased to 0.47 by homogenizing at 1000 p.s.i.g. This and other test results show that homogenization will densify hydrated alumina precipitated in the pH range from 7–9.0 when it has been aged at pH values in the range of about 10.4 to 11.0 for about 0.25–6 hours; longer times including overnight aging (16 hours) may of course be used if desired but are seldom necessary. The aging does not appear to be affected by varying the aging temperatures within the range of about 60°–130° F.

It will also be understood from the above-described test results that the density increase upon homogenization of hydrated alumina precipitated in the pH range of 9.0 to about 10.5 is further increased by aging it for the same times at a higher pH within the range of 10.0–11.0 and at the same temperatures.

Homogenizing pressures up to about 3000 lbs. per square inch may be used, and pressures in the range of about 500–2500 p.s.i. are usually employed. These figures represent the pressure drop across the homogenizing valve.

EXAMPLE 4

This example shows the application of the principles demonstrated in Examples 1 and 2 for the preparation of alumina-base catalysts wherein a low density, with a correspondingly high volume activity, are desired. Catalysts of this type are the chromia-alumina catalysts containing about 10% to 30% of $Cr_2O_3$, which are used for organic dehydrogenation reactions, and alumina-molybdena catalysts containing about 8% to 20% of $MoO_3$ that are used in hydroforming petroleum fractions boiling in the gasoline range.

In accordance with one feature of our invention such catalysts are made by spray drying a uniform slurry of hydrated alumina and an activating metal compound, such as chromic acid or ammonium molybdate, and pelleting the spray dried product. Good yields in the spray drying step and good flow properties at the tableting machines are dependent to a considerable extent on the particle size of the spray dried material. Too fine and too light a powder cannot be collected to good yields in the spray drier cyclones and does not feed evenly from the hoppers to the feed frame and dies of an automatic pelleting machine.

In order to obtain a pelleted catalyst of low density it is necessary to prepare the hydrated alumina in such a way that its response to homogenization, which maintains a uniform particle size in the spray dried mixture, is not too great. The alumina is therefore precipitated and aged under pH conditions such as to obtain an apparent bulk density of about 0.40 in the spray dried material; this will produce an A.B.D. of about 0.65–0.72 in the final catalyst pellets.

A low density alumina base is prepared as follows:

To a turbine-agitated strike tank containing a water heel of 78 gallons there is simultaneously added, in separate streams, 231 lbs. of a sodium aluminate solution containing 29% $Al_2O_3$ and 454 lbs. of an aqueous aluminum sulfate solution containing 5.8% $Al_2O_3$ at rates such as to maintain in the tank a constant pH between 9.3 and 9.5 while controlling the strike temperature to a maximum of 120° F. by cooling coils. At the end of the strike the flow of alum solution is reduced to allow the pH to rise to 10.0 and the slurry is aged for 30 minutes at this pH. It is then dewatered on a vacuum filter and the filter cake is washed with three displacements of water. It is then repulped to 7% solids by the addition of 400 lbs. of water to 400 lbs. of the wet filter cake, the pH is adjusted to 7.0 by adding 10–14 lbs. of 31% nitric acid and the slurry is again aged 30 minutes, dewatered and the filter cake is washed with pure water. The cake contains 13.2% $Al_2O_3$, 0.027% $Na_2O$ and 0.06% sulfate.

The following procedure is used for making a pelleted 20% $Cr_2O_3$ catalyst from this base.

To 300 lbs. of the washed filter cake add 86.7 lbs. of 15% chromic acid solution while agitating vigorously. After the chromic acid solution is thoroughly impregnated into the alumina the slurry is homogenized and dried by nozzle atomization into a spray drier having an inlet gas temperature of 500–600° F. For alumina made at a pH of 9.5 a net pressure drop of 700 lbs. across the homogenizer valve will produce a dried product of 0.40 gram per cc. This spray dried material is mixed with about 1% of graphite or other die lubricant and pelleted to ⅛-inch to ⅜-inch diameter pellets on an automatic tabletting machine. The raw tablets are calcined by heating to about 1100° F. during about 2 hours and holding at this temperature for an additional one hour. Their apparent bulk density after calcining is 0.66 gram per cc.

Low density pellets containing molybdenum oxide are made by the same procedure. For an 11% $MoO_3$ hydroforming catalyst 31.5 lbs. of ammonium molybdate solution containing 15% molybdenum oxide are added with vigorous agitation to 300 lbs. of the washed alumina filter cake and the resulting slurry is homogenized, spray dried, pelleted and calcined as described above. The A.B.D. of the calcined pellets is 0.65–0.70 gram per cc.

EXAMPLE 5

The attrition resistance of a fluid type alumina gel catalyst increases with an increase in its density up to an A.B.D. of about 1 gram per cc. and therefore catalysts of this type have a relatively high density. Application of the principles of our invention to the production of such catalysts is illustrated by the following procedures.

In order to make a high density alumina base the strikes show in Examples 1 and 2 are carried out at pH values of about 9.5 to 10.5 and the slurry is aged for at least one-half hour at a higher pH between 10.2 and 11.0 before the first filtration. When alum and sodium aluminate are used the repulping and second filtration are as described in Example 2.

In preparing a high density microspheroidal catalyst containing 20% of chromium oxide and 80% of alumina and suitable for use in the fluid bed dehydrogenation of butane, propane or ethane the sodium aluminate and alum solutions of Example 2 are reacted as described in that example while maintaining the pH of the strike at 9.5–9.7. After aging at a pH between 10.2 and 10.4 the hydrated alumina is filtered and washed and the filter cake is mixed with chromic acid solution or with a solution of ammonium chromate or ammonium bichromate, all as described in that example.

When the resulting slurry is homogenized the pressure drop across the homogenizer valve is increased to 1000–2000 p.s.i. and preferably is maintained at about 1800 p.s.i. After spray drying to a water content (loss on ignition) of about 25–30% the A.B.D. is about 1.13 to 1.15 and after calcining to 1100° F. for 2 hours its bulk density is from 0.9 to 1.0 and its attrition resistance as determined by the method described in U.S. Patent No. 2,768,125 is about 7% overhead after 45 hours.

The same procedure is used in making a fluidizable 11% $MoO_3$—89% $Al_2O_3$ catalyst but still higher pH values and homogenization pressures are employed because the ammonium molybdate does not have the peptizing action of chromic acid on the hydrated alumina. The strike described in Example 3 is therefore carried out at a pH of 9.9 and the unfiltered slurry is aged for 0.5–1 hour at pH 11. The spray drier feed slurry is homogenized at 1500 to 2200 p.s.i. and the spray dried material is calcined by heating to 1200° F. The A.B.D. of the spray dried product is then 0.96 gram per cc.; after the calcination it is about 0.85 to 0.87.

This is a division of our copending application Serial No. 660,000, filed May 17, 1957, now Patent No. 2,980,632.

What we claim is:

1. A method of producing alumina of controlled density which comprises densifying by homogenization an aqueous slurry of a hydrated alumina to an extent corresponding to that obtained by passing such an aqueous slurry through a homogenizing valve at a pressure drop between about 500 and 3000 p.s.i. and thereafter drying the resulting densified hydrated alumina, said hydrated alumina slurry being produced by precipitating hydrated alumina from an aqueous solution of a water-soluble aluminum compound by admixture of a neutralizing agent therewith at a pH of from 7 to 10.5 and ageing at a temperature of about 90 to 130° F. for at least 0.25 to 0.5 hour at a higher pH within the range of 10 to 11.

2. A method of producing a purified alumina of controlled density which comprises densifying by homogenization an aqueous slurry of a hydrated alumina to an extent corresponding to that obtained by passing such an aqueous slurry through a homogenizing valve at a pressure drop between about 500 and 3000 p.s.i. and thereafter drying the resulting densified hydrated alumina, said hydrated alumina slurry being produced by precipitating hydrated alumina from an aqueous solution of a water-soluble aluminum compound by admixture of a neutralizing agent therewith at a pH of from 9 to 10.5, ageing at a temperature of 90 to 130° F. for at least 0.5 hour at a higher pH within the range of 10 to 11 and filtering and washing substantially free from inorganic salts.

(References on following page)

References Cited in the file of this patent

UNITED STATES PATENTS

| | | |
|---|---|---|
| 2,590,833 | Bechtold | Apr. 1, 1952 |
| 2,657,115 | Ashley | Oct. 27, 1953 |
| 2,737,444 | Fisher et al. | Mar. 6, 1956 |
| 2,809,169 | Whiteley et al. | Oct. 8, 1957 |
| 2,838,375 | Teter et al. | June 10, 1958 |
| 2,867,588 | Keith et al. | Jan. 6, 1959 |
| 2,914,486 | Schwartz | Nov. 24, 1959 |

OTHER REFERENCES

Pauling, L.: "College Chemistry," W. H. Freeman & Co., San Francisco, Calif., 1950, page 424.